Patented Mar. 11, 1930

1,749,781

UNITED STATES PATENT OFFICE

LUDWIG SCHERTEL AND WILLI LÜTY, OF ESSEN, GERMANY, ASSIGNORS TO THE FIRM TH. GOLDSCHMIDT A.-G., OF ESSEN, GERMANY

METHOD OF OBTAINING LEAD OXIDE IN A STATE OF HIGH DISPERSION

No Drawing. Application filed February 4, 1925, Serial No. 6,894, and in Germany February 8, 1924.

This invention has to do with the production of finely subdivided litharge and consists in improvements of that method according to which a lead containing raw material, preferably metallic lead or lead oxide in a coarser state of distribution, is converted into lead-oxide vapors approximating gaseous conditions by application of heat, the vapors condensed into fumes whilst dispersed in a gaseous medium, and the fumes precipitated from said gaseous medium by suitable precipitating means.

This method as hitherto practised is deficient in this that on the way to the precipitating means the condensed fumes are likely to adhere to the walls of the conduits and to stick together to coarser particles thus reducing the quantity and deteriorating the quality of the final product.

Now according to this invention these drawbacks of the said method as hitherto practised are overcome by suddenly cooling the vapors to be treated, such sudden cooling being effected by introducing therein cold air, water, combustion gases which have been suitably cooled down or the like.

For carrying out the invention one may proceed as follows: Lead oxide or molten metallic lead is allowed to drizzle through a shaft filled with blocks of refractory material heated to very high temperature of say 1000–1200° C. by oxidizing fire gases flowing upwards through the shaft. Thereby the molten lead or the lead oxide, as the case may be, is converted into vapor, the lead at the same time being converted into lead oxide. The lead oxide vapors dispersed in the fire gases leave the shaft at its top end and are conducted to suitable dust separating means such as an electric high-tenson gas purifying plant. On the way to the dust separating device according to one embodiment of this invention a quantity of atmospheric air of normal temperature is introduced into the gas current carrying the lead oxide vapor, the quantity of air being preferably 1 to 2 volumes of air to 1 volume of gas mixture. Thereby a sudden reduction in temperature of the gas mixture from say 1000 to 500–300° C. is effected and the lead oxide vapor condensed into particles of extreme fineness which remain suspended in the gas current without showing the tendency to materially adhere to the wall of the conduit or to sick together so as to form a coarser modification of lead oxide. In this way lead oxide in the state of high dispersity may be obtained in the gas purifying plant without material loss in substance.

A further increase in output may be secured by using the suitably cooled purified gas, which leaves the gas purifying or lead oxide preceipitating plant as a means for suddenly cooling the fire gases containing the lead oxide vapors. In doing so it is only necessary to allow a quantity of gas to escape which is equal to the quantity of combustion gases flowing through the shaft and to thereby avoid the loss of that quantity of lead oxide which otherwise would be carried away with the air admixed to the fire gases.

In a further embodiment of the invention water preferably in a state of fine distribution may be used for effecting the sudden cooling of the mixture of gas and lead oxide vapors.

The dispersity of the lead oxide obtained is nearly related to the intensity of cooling the gas medium carrying the vapors of lead oxide. The degree of dispersity can be increased within certain limits by increasing the suddenness of cooling the gas medium.

What we claim is:

1. A method of obtaining lead oxide in a state of high dispersion from a hot gas medium carrying lead oxide vapors comprising suddenly cooling said gas medium and subjecting the cooled gas medium with the fine particles of lead oxide suspended therein to dust precipitating means.

2. A method of obtaining lead oxide in a state of high dispersion from a hot gas medium carrying lead oxide vapors comprising introducing a cooling medium into said gas medium and subjecting the cooled gas medium with the fine particles of lead oxide suspended therein to dust precipitating means.

3. A method of obtaining lead oxide in a state of high dispersion from a hot gas medium carrying lead oxide vapors comprising introducing a cooling medium in gaseous form into said gas medium and subjecting the cooled gas medium with the fine particles of lead oxide suspended therein to dust precipitating means.

In testimony whereof we have signed our names to this specification.

LUDWIG SCHERTEL.
WILLI LÜTY.